United States Patent
Muraki

(10) Patent No.: US 8,988,425 B2
(45) Date of Patent: Mar. 24, 2015

(54) IMAGE DISPLAY CONTROL SYSTEM, IMAGE DISPLAY CONTROL METHOD, AND IMAGE DISPLAY CONTROL PROGRAM

(75) Inventor: Yuji Muraki, Okazaki (JP)

(73) Assignee: Aisin AW Co., Ltd., Aichi-ken (JP)

(*) Notice: Subject to any disclaimer, the term of this patent is extended or adjusted under 35 U.S.C. 154(b) by 174 days.

(21) Appl. No.: 13/594,033

(22) Filed: Aug. 24, 2012

(65) Prior Publication Data

US 2013/0063427 A1 Mar. 14, 2013

(30) Foreign Application Priority Data

Sep. 12, 2011 (JP) ................................. 2011-198465

(51) Int. Cl.
*G06T 15/00* (2011.01)
*G01C 21/36* (2006.01)

(52) U.S. Cl.
CPC .................................. *G01C 21/3638* (2013.01)
USPC ............ 345/419; 345/423; 345/427; 345/173

(58) Field of Classification Search
CPC .................................................. G01C 21/3638
USPC .................................. 345/419, 423, 427, 173
See application file for complete search history.

(56) References Cited

U.S. PATENT DOCUMENTS

| 6,392,658 | B1 | 5/2002 | Oura | |
|---|---|---|---|---|
| 6,741,250 | B1 * | 5/2004 | Furlan et al. | 345/427 |
| 7,843,451 | B2 * | 11/2010 | Lafon | 345/423 |
| 8,542,209 | B2 * | 9/2013 | Lim | 345/173 |
| 8,638,312 | B2 * | 1/2014 | Lim | 345/173 |
| 8,681,151 | B2 * | 3/2014 | Coombe et al. | 345/423 |

FOREIGN PATENT DOCUMENTS

| JP | 3-225391 A | 10/1991 |
|---|---|---|
| JP | 200090232 A | 3/2000 |
| JP | 2002213984 A | 7/2002 |
| JP | 2006186840 A | 7/2006 |
| JP | 2007109205 A | 4/2007 |
| JP | 200919970 A | 1/2009 |
| JP | 2009-250714 A | 10/2009 |

* cited by examiner

*Primary Examiner* — Phu K Nguyen
(74) *Attorney, Agent, or Firm* — Sughrue Mion, PLLC

(57) ABSTRACT

An image display control system and method are provided. The image display control system includes a feature information acquiring unit that acquires feature information indicating a three-dimensional shape and a position of a feature. The image display system also includes a birds-eye view data creating unit that creates a birds-eye view and a panoramic view data creating unit that creates a panoramic view. The birds-eye view shows scenery to be acquired when viewing in a travel direction of a navigation terminal downward from a view position that is set at an upper point above a current position of the navigation terminal and the panoramic view shows scenery to be acquired when viewing a predetermined directional area including the travel direction of the navigation terminal at the current position. The image display control system also includes an image display control unit that displays the panoramic view above the birds-eye view.

7 Claims, 4 Drawing Sheets

IMAGE DISPLAY CONTROL SYSTEM, IMAGE DISPLAY CONTROL METHOD, AND IMAGE DISPLAY CONTROL PROGRAM

INCORPORATION BY REFERENCE

This application claims priority from Japanese Patent Application No. 2011-198465, filed on Sep. 12, 2011, including the specification, drawings and abstract thereof, the disclosure of which is incorporated herein by reference in its entirety.

BACKGROUND OF THE INVENTION

1. Field of the Invention

Aspects of the present invention relate to an image display control system, an image display control method, and an image display control program.

2. Description of the Related Art

Conventionally, a technology is known, in which the surrounding of a current position is displayed such that a user can instinctively recognize it on a navigation terminal or the like. For example, Japanese Patent Application; Publication No. JP-A-03-225391 and Japanese Patent Application; Publication No. JP-A-2009-250714 disclose configuration to show the scenery ahead of the navigation terminal using a birds-eye view.

SUMMARY OF THE INVENTION

The birds-eye view as described above enables the user to instinctively recognize the surrounding of the current position of the navigation terminal. However, the user cannot recognize the area other than the area that is displayed in the bird-eye view.

In view of the aforementioned problem, it is an aspect of the present invention to provide a technology that enables the user to recognize the area other than the area that is displayed in the birds-eye view while the birds-eye view is visible to the user.

To achieve the aforementioned aspects, in the present invention, a panoramic view, on which an icon representing the travel direction of the navigation terminal is superimposed, is displayed together with the birds-eye view. That is, the panoramic view shows the scenery to be acquired when viewing in a predetermined directional area including the travel direction of the navigation terminal at the current position. On the other hand, the birds-eye view shows the scenery to be acquired when viewing in the travel direction of the navigation terminal. Consequently, by displaying the panoramic view together with the birds-eye view, it is possible to make the user recognize the area other than the area displayed in the birds-eye view while the birds-eye view is visible to the user.

Further, in the panoramic view, it is possible to view features existing in a broad area at a glance. Therefore, by displaying the panoramic view together with the birds-eye view that makes the user instinctively recognize a relatively-narrow area, it becomes possible for the user to recognize features existing both in the narrow area and the broad area with a glance at the display part. Further, the panoramic view is likely to be different from the people's view of the features because the features existing in a broad area are shown in one sheet of drawing in the panoramic view. However, in the panoramic view according to the present invention, an icon representing the travel direction of the navigation terminal is superimposed. Therefore, the user can instantaneously recognize the relation between the respective features in the panoramic view showing the broad area and the user's position.

Here, the feature information acquiring unit is configured to acquire the feature information indicating a three-dimensional shape and position of each feature. That is, the birds-eye view and the panoramic view are displayable based on the feature information by previously storing the feature information with which the three-dimensional shape of the feature can be reproduced for each position of the feature on the display part. The feature may include all objects viewable from the view position such as ground, roads, facilities, mountains, rivers, and the like. Any of the viewable objects may not be displayed for reduction of processing load.

The birds-eye view data creating unit is configured to create image data of the birds-eye view showing the scenery to be acquired when viewing in the travel direction of the navigation terminal downward from the view position that is set at an upper point above the current position of the navigation terminal. That is, it is configured to draw the birds-eye view to display on the two-dimensional display part the scenery to be acquired when viewing in the travel direction downward from the view position, which is assumed at a position upward from the moving flat surface of the navigation terminal. On the display part, only the three-dimensional shapes of the features may be reproduced. Therefore, the position of the circumference when viewing each feature from the view position is determined based on the feature information and the circumference is drawn by a line on the display part. Obviously, the surface of the feature may be colored in the design similar to the real surface of the feature in the birds-eye view.

The panoramic view data creating unit is configured to create the image data of the panoramic view showing the scenery to be acquired when viewing a predetermined directional area including the travel direction of the navigation terminal at the current position, the panoramic view on which an icon representing the travel direction is superimposed. That is, it is configured to draw the panoramic view showing the scenery to be acquired by the user of the navigation terminal when the user has changed the view direction by rotating around a rotational axis parallel to a line passing the current position in the vertical direction. Here, the area in which the view direction is changed corresponds to the predetermined directional area. Further, in the present invention, an icon representing the travel direction of the navigation terminal is superimposed on the panoramic view. The icon is displayed in a manner in which the user can recognize the travel direction of the navigation terminal; therefore, the shape, the color, and the like are not limited.

The image display control unit is configured to display the birds-eye view and the panoramic view on the display part installed in the navigation terminal, based on the image data of the birds-eye view and the image data of the panoramic view. That is, the birds-eye view and the panoramic view are displayed together on the display part. The positions of the birds-eye view and the panoramic view are not limited. However, the positions are preferably adjusted such that the direction corresponding to the travel direction of the navigation terminal in the birds-eye view matches with the direction corresponding to the travel direction of the navigation terminal in the panoramic view.

In addition, besides the travel direction of the navigation terminal, supplemental information may be superimposed on the panoramic view. For example, at least one of an icon representing a bearing and an icon representing a relative direction when the travel direction of the navigation terminal is set as a front direction may be superimposed on the panoramic view. The bearing here is only required to be a specific direction in a fixed coordinate system which is relatively fixed to the ground surface. For example, the bearing corresponds to information such as north, south, east, west, southeast, and the like. The relative direction when the travel direction of the navigation terminal is set as the front direction is a direction that can be compared to the front direction. For example, the relative direction when the travel direction of the navigation terminal is set as the front direction corresponds to the information such as a leftward direction, a rightward direction, a backward direction, and the like. Because of the aforementioned configuration, the user can instinctively recognize the relation between the positions of the features in the panoramic view and the actual positions of the features.

Further, in order to make the displayed contents in the panoramic view easy to follow, the aforementioned directional area determining the right and left area in the panoramic view may be determined such that the predetermined area right behind the travel direction is included without being divided in the panoramic view. According to such a configuration, the predetermined area right behind the travel direction is displayed without being divided. Therefore, the user can easily recognize the features existing right behind, which is a direction the user can instinctively recognize, in the panoramic view.

Further, the features existing in a direction within a previously-determined area from at least one of an icon representing a bearing and an icon representing a relative direction when the travel direction is set as the front direction may be set as target for display in the panoramic view and the features existing at other positions may not be set as target for display in the panoramic view. That is, if all viewable features are displayed in the panoramic view showing the scenery of a broad area, the panoramic view can be very difficult to follow because of excess number of displayed features.

Therefore, if the features existing in a direction within a previously-determined area from at least one of an icon representing a bearing and an icon representing a relative direction when the travel direction of the navigation terminal is set as the front direction are set as target for display, the panoramic view can be displayed without lowering the visibility of the features. Here, the features existing in a direction within a previously-determined area from at least one of an icon representing a bearing and an icon representing a relative direction when the travel direction of the navigation terminal is set as the front direction are set as target for display. Therefore, the features existing in a bearing or a direction the user can instinctively recognize can be displayed in the panoramic view. Thereby, it is possible to display the panoramic view that is easy to follow for the user, while limiting the number of features. The previously-determined area may be determined as an area of, for example, ±10 degrees such that the features within the area are regarded as existing in a bearing or a direction (a relative direction when the travel direction of the navigation terminal is set as the front direction) represented by an icon in the panoramic view.

Further, the technique of displaying the birds-eye view and the panoramic view together and superimposing the travel direction of the navigation terminal on the panoramic view can be applied to a program and a method in which this processing is executed. In addition, the image display control system, the method, and the program as mentioned above are realized as a single device or a plurality of devices. The image display control system, the method, and the program may be realized with parts used in common by the respective components provided in the vehicle, or realized in connection with the respective parts not provided in the vehicle. Various kinds of modes are included. Or, the structure can be changed as appropriate. For example, a part of the structure can be realized by software and another part by hardware. In addition, the invention can be practiced with a storage medium of a program that controls the image display control system. Obviously, the storage medium of the software may be a magnetic storage medium or an optical storage medium. In addition, any storage medium to be developed in future can be applied in the same manner.

DETAILED DESCRIPTION OF THE EXEMPLARY EMBODIMENT

Here, embodiments of the present invention are explained in the following order.

Figure 1:
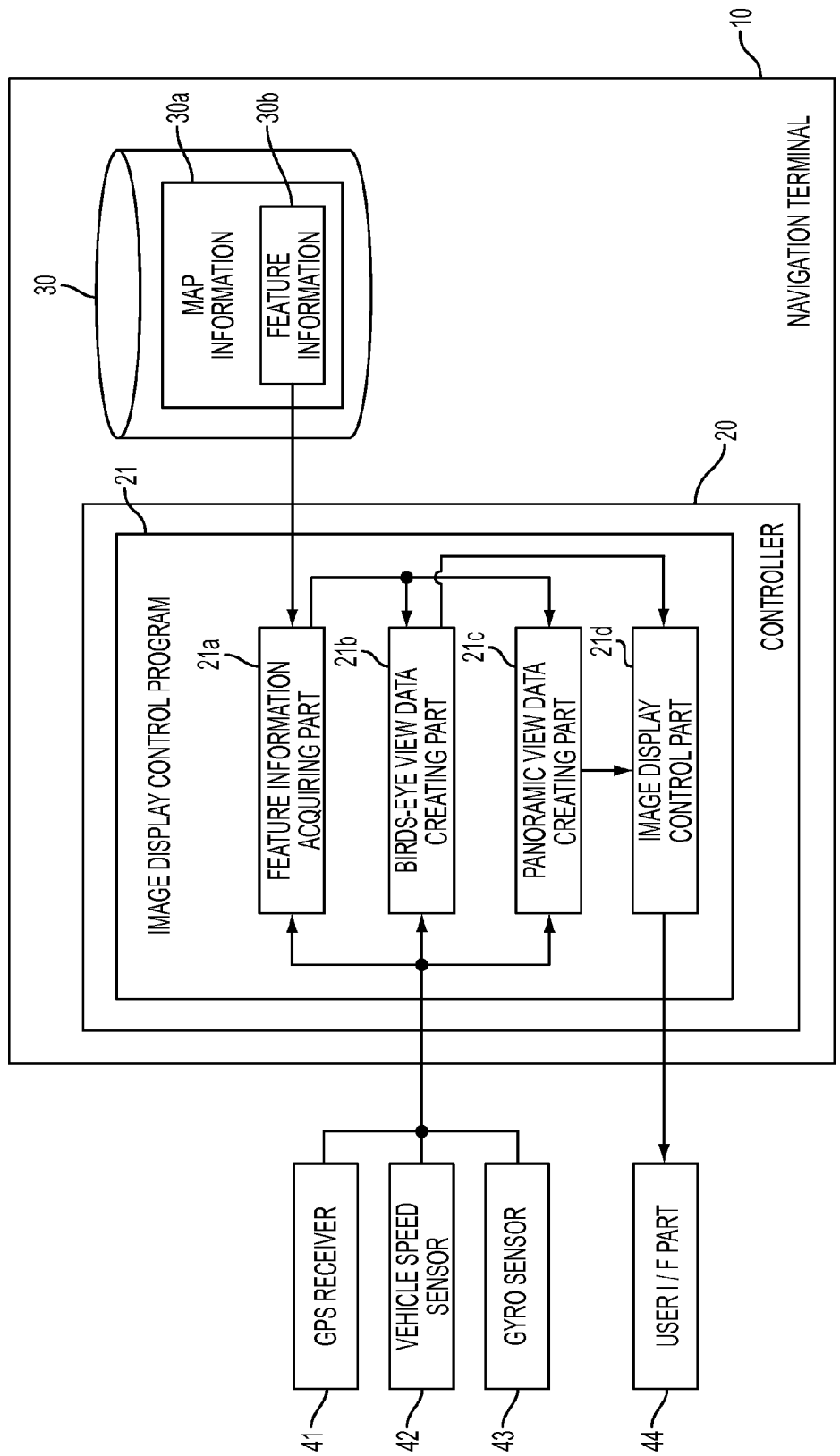
FIG. 1 is a block diagram showing a navigation terminal including an image display control system.

(1) Configuration of navigation terminal
(2) Image display control processing
(2-1) Panoramic view data creating processing
(3) Other embodiments (1) Configuration of Navigation Terminal FIG. 1 is a block diagram showing the configuration of an image display control system installed in a vehicle. In the present embodiment, the image display control system is realized by a navigation terminal 10. The navigation terminal 10 is provided with a controller 20 including a CPU, a RAM, a ROM, and the like. Programs stored in the ROM can be executed on the controller 20. In the present embodiment, a navigation program can be executed as such program. The navigation program is a program that causes the controller 20 to realize a function that guides a user to a destination by displaying various kinds of maps on a display part of the navigation terminal 10. The navigation program includes an image display control program 21 that displays a birds-eye view and a panoramic view on the display part.

The vehicle according to the present embodiment is provided with a GPS receiver 41, a vehicle speed sensor 42, a gyro sensor 43, and a user I/F part 44. The GPS receiver 41 receives electronic waves from a GPS satellite and outputs signals indicating signals for calculating the current position of the vehicle through an interface (not shown). The controller 20 acquires these signals to acquire the current position of the vehicle. The vehicle speed sensor 42 outputs signals corresponding to a rotation speed of the wheels provided on the vehicle. The controller 20 acquires these signals through an interface (not shown) to acquire the vehicle speed of the vehicle. The gyro sensor 43 detects angular acceleration for a turn in a horizontal plane of the vehicle and outputs signals corresponding to an orientation of the vehicle. The controller 20 acquires these signals to acquire the travel direction of the vehicle. The vehicle speed sensor 42, the gyro sensor 43, and the like are utilized to correct the current position of the vehicle that is determined with the signals outputted by the GPS receiver 41, or the like. In addition, the current position of the vehicle is corrected based on the travel track of the vehicle as needed.

The user I/F part 44 is an interface part to input instructions of the user or to supply various kinds of information to the user. The user I/F part 44 is provided with the display part including a touch panel display (not shown), an input part such as a switch, and an audio output part such as a speaker. The user I/F part 44 receives signals from the controller 20 and displays an image to provide various kinds of guidance on the touch panel display.

A storage medium 30 stores map information 30*a*. The map information 30*a* includes node data indicating nodes corresponding to end points of a road where the vehicle is traveling, shape interpolating point data for determining shapes of roads between nodes, link data indicating links between nodes. The map information 30*a* includes feature information 30*b* indicating a plurality of features existing on the road or in the vicinity of the road. In the present embodiment, the feature information 30*b* is information indicating an attribute, a position, an altitude, and a three-dimensional shape of each feature. The information indicating the three-dimensional shape includes information indicating coordinates (relative coordinates based on the position of each feature) of vertexes of an outer shape of the feature and design of circumference of the feature. In addition, for well-known features, image data indicating an image showing the three-dimensional shapes of each feature and information indicating the position of the feature are defined and included in the feature information 30*b*.

In the present embodiment, the attribute of the feature is information indicating what the feature is. For example, the attribute of the feature includes information such as facility, background (mountain, land surface, and the like). The position is information indicating a position in a two-dimensional coordinate system. The altitude is information indicating a position in a direction perpendicular to the coordinate system. The node data and the link date compose the feature information 30*b* indicating a feature whose attribute is a road. Therefore, in the present embodiment, not only the position but also the altitude of the node is recorded as the feature information 30*b*.

That is, in the present embodiment, the feature can be three-dimensionally drawn in a virtual three-dimensional space by structuring a polygon in a shape similar to the circumference of the feature based on the information indicating the aforementioned coordinate and coloring the polygon based on the information indicating the design. In addition, for well-known features, by displaying an image indicated by the image data, an object similar in a shape and a color to each feature can be three-dimensionally drawn.

The known level may be determined by the scale of the facility, the degree recognized by people, and the like. In addition, if the attribute of the feature information 30*b* is a facility (a prefectural office, a city office, or the like) in which administrative works are carried out, the information indicating the population of the administrative area under jurisdiction and the name of the administrative area is associated. Further, the map information 30*a* and the feature information 30*b* are provided for each mesh. That is, nodes, links and features are provided for each mesh. It is possible to determine in which mesh the respective nodes, links and features are included.

The controller 20 executes the image display control program 21 included in the navigation program to execute the processing to display the birds-eye view and the panoramic view on the display part of the user I/F part 44. To execute such processing, the image display control program 21 is provided with a feature information acquiring part 21*a*, a birds-eye view data creating part 21*b*, a panoramic view data creating part 21*c*, and an image display control part 21*d*.

The feature information acquiring part 21*a* is a program module that causes the controller 20 execute a function to acquire feature information indicating a three-dimensional shape and a position of a feature. That is, in the present embodiment, the controller 20 determines the current position of the navigation terminal 10 based on the signals outputted by the GPS receiver 41, the vehicle speed sensor 42, and the gyro sensor 43, and determines the mesh to be referred when drawing the birds-eye view and the panoramic view based on the current position. Further, the controller 20 acquires the feature information 30*b* included in the mesh to be referred from the storage medium 30.

The birds-eye view data creating part 21*b* is a program module that causes the controller 20 execute a function to create image data of the birds-eye view showing the scenery to be acquired when viewing in the travel direction of the navigation terminal 10 downward from the view position that is set at an upper point above the current position of the navigation terminal 10. The controller 20 in the present embodiment determines the current position and the travel direction of the navigation terminal 10 based on the signals outputted by the GPS receiver 41, the vehicle speed sensor 42, and the gyro sensor 43. In the present embodiment, the travel direction of the navigation terminal 10 and the travel direction of the vehicle are the same.

Further, the controller 20 sets the view position to a position above the current position, the position being on a line parallel to a line passing the current position of the navigation terminal 10 in a vertical direction. Further, the controller 20 supposes a view direction when viewing in the travel direction downward from the view position, supposes a virtual projection plane in a direction perpendicular to the view direction at a position by a predetermined distance from the view position in the view direction, and sets a predetermined area of the projection plane as a display area. Further, the controller 20 refers to the feature information 30*b* acquired by the processing of the feature information acquiring part 21*a* and structures polygons of the features existing ahead of the current position based on the coordinates of the features. Thereafter, the controller 20 specifies the coordinates of the intersection points between the lines connecting the vertexes of the polygons and the view position and the aforementioned projection plane and draws the circumferences of the background and the roads on the projection plane by connecting the coordinates by line. Thereafter, the controller 20 draws the birds-eye view by coloring the parts corresponding to the pictures of the features with the designs of the features, and records the birds-eye view data showing the drawn birds-eye view in the RAM (not shown).

The panoramic view data creating part 21*c* is a program module that causes the controller 20 execute a function to create image data of the panoramic view showing the scenery to be acquired when viewing a predetermined directional area including the travel direction of the navigation terminal 10 at the current position of the navigation terminal 10, the panoramic view on which an icon representing the travel direction of the navigation terminal 10 is superimposed. That is, the controller 20 supposes a view direction when viewing in the travel direction downward from the view position supposed as above, the view direction with a depression angle smaller (capable of looking into the distance) than the view direction utilized when drawing the birds-eye view. Further, the controller 20 sets, as a rotation axis of the view direction, the aforementioned line that is parallel to the line passing the current position of the navigation terminal 10 in a vertical direction. The controller 20 draws, as a panoramic view, the scenery to be acquired when rotating the view direction in a predetermined directional area from the aforementioned view position centering on the travel direction of the navigation terminal 10. The drawn panoramic view is recorded in the RAM (not shown) as panoramic view data. The detailed processing for drawing the panoramic view is described later.

In the present embodiment, the controller 20 superimposes an icon representing the travel direction of the navigation terminal 10 on the panoramic view. That is, by drawing the panoramic view as mentioned above, in the present embodiment, the central orientation in a right and left direction of the panoramic view extending rightward and leftward becomes the travel direction of the navigation terminal 10. The controller 20 corrects panoramic view data such that the icon representing the travel direction of the navigation terminal 10 is superimposed at the center of the panoramic view. The shape and color of the icon is optional. In the present embodiment, a black triangle is utilized as the icon.

The image display control part 21*d* is a program module that causes the controller 20 execute a function to display the birds-eye view and the panoramic view on the display part of the user I/F part 44 based on the image data of the birds-eye view and the image data of the panoramic view. That is, the controller 20 acquires the birds-eye view data and the panoramic view data that was created as mentioned above and outputs the data together with the information indicating the display positions on the display part to the user I/F part 44. As a result, the birds-eye view and the panoramic view are displayed at the instructed display positions on the display part of the user I/F part 44. Here, it is only necessary that the birds-eye view and the panoramic view are displayed together on the display part. The display positions of these views are not limited. In the present embodiment, the positions are set such that the direction corresponding to the travel direction of the navigation terminal 10 in the birds-eye view matches with the direction corresponding to the travel direction of the navigation terminal 10 in the panoramic view.

Figure 4A:
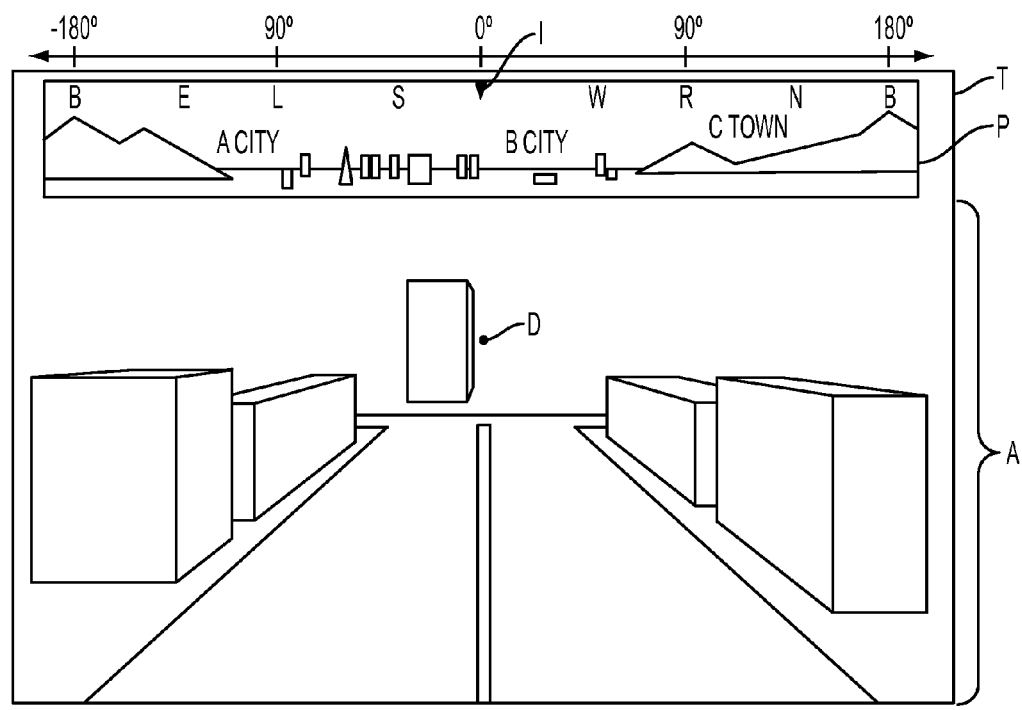
FIGS. 4A and 4B show an example of a case in which a birds-eye view and a panoramic view are displayed together.

A rectangular T shown in FIG. 4A shows a display example on the display part. In the rectangle T in FIG. 4A, a panoramic view P is displayed at an upper side and a birds-eye view A is displayed at a lower side. In the rectangle T in FIG. 4A, a black triangle icon I representing the travel direction of the navigation terminal 10 is shown at the center in the right and left direction of the panoramic view P. In the birds-eye view A, a position D corresponds to the travel direction, and the position D is located at the center in the right and left direction of the birds-eye view A. Consequently, in this example, the direction corresponding to the travel direction of the navigation terminal 10 in the birds-eye view and the direction corresponding to the travel direction of the navigation terminal 10 in the panoramic view exist at the same position in the vertical direction of the rectangular T. Thus, the both directions match.

Because of the aforementioned configuration, in the display part of the user I/F part 44, the panoramic view on which an icon representing the travel direction of the navigation terminal 10 is superimposed is displayed together with the birds-eye view. Consequently, by viewing the panoramic view, the user can recognize the features included in the scenery in the predetermined directional area including the travel direction of the navigation terminal 10. Thereby, the user can recognize the relation between the features in a broad area in the vicinity of the current position of the navigation terminal 10 and the current position. On the other hand, by viewing the birds-eye view, the user can recognize the features included in a relatively-narrow area in the vicinity of the travel direction of the navigation terminal 10. Thereby, the user can instinctively recognize the relation between the features in a narrow area ahead of the current position of the navigation terminal 10 and the current position. Therefore, in the present embodiment, in which the birds-eye view and the panoramic view are displayed together, the user can recognize at a glance the features existing both in the narrow area and the broad area only by viewing the display part.

The panoramic view shows the features existing in a broad area in one sheet of drawing. Therefore, the panoramic view is likely to be different from the people's view of the features. However, in the panoramic view according to the present invention, the icon representing the travel direction of the navigation terminal 10 is superimposed. Therefore, the user can instantaneously recognize the relation between the respective features in the panoramic view showing a broad area and the user's position. Further, the user can easily recognize the relation between the birds-eye view and the panoramic view because the respective views are displayed such that the travel direction of the navigation terminal 10 is located at the same position in the right and left direction of the display part in the birds-eye view and the panoramic view.

(2) Image Display Control Processing

Figure 2:
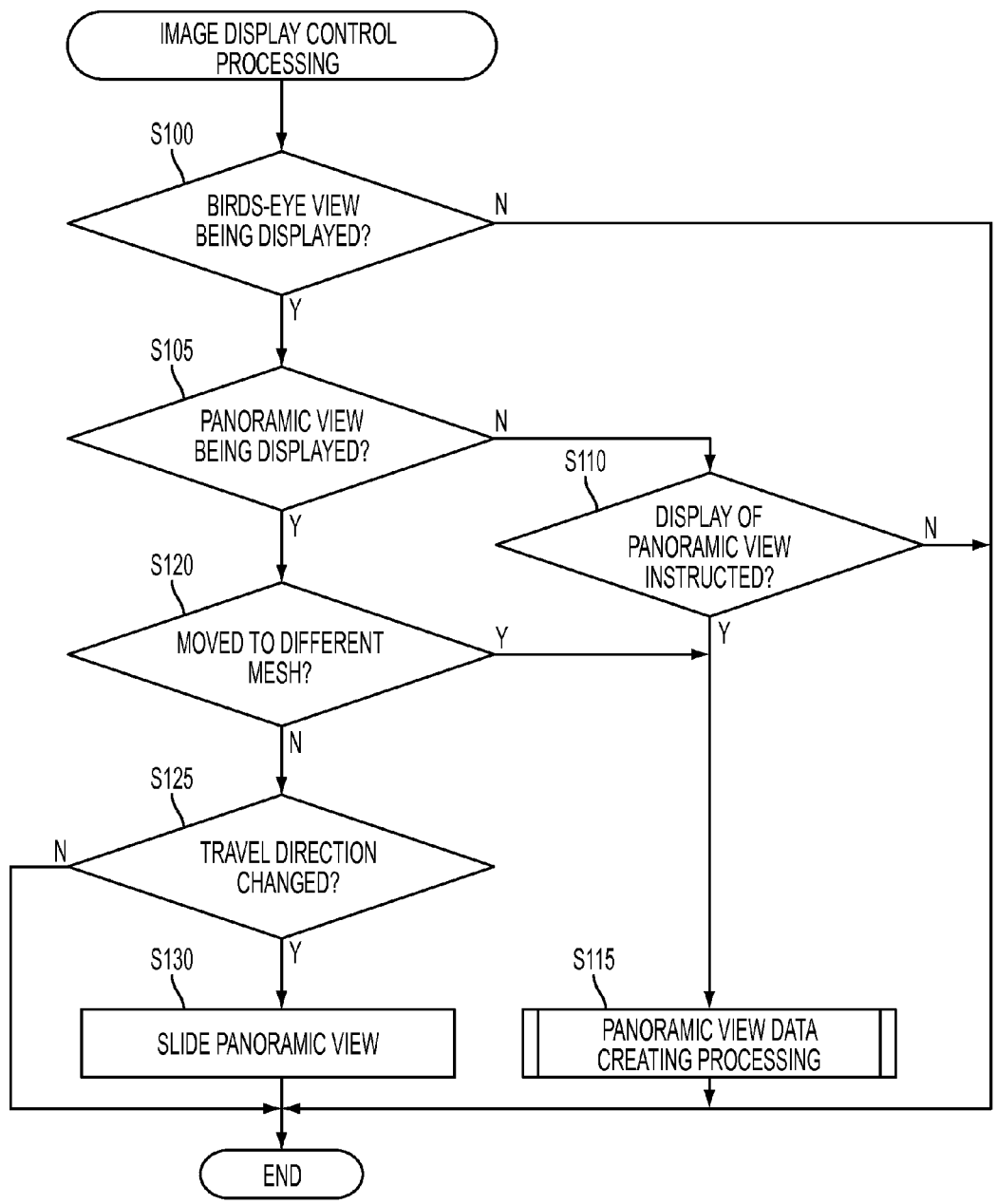
FIG. 2 is a flow chart showing image display control processing.

Next, image display control processing is explained in detail. FIG. 2 is a flow chart of the image display control processing. The image display control processing according to the present embodiment is executed at predetermined intervals (for example, every 100 ms). In the present embodiment, the navigation program normally provides guidance on a destination and the like to the user with a two-dimensional map being displayed on the display part of the user I/F part 44. However, the navigation program displays the birds-eye view on the display part when there is a predetermined specific position (such as a specific intersection) within a predetermined distance ahead of the current position of the navigation terminal 10, or when instructed by the user on the user I/F part 44.

The navigation program displays the panoramic view and the birds-eye view together when instructed by the user on the user I/F part 44 while the birds-eye view is being displayed. In the present embodiment, when the conditions for the display of the birds-eye view on the display part are met, the controller 20, by the processing of the feature information acquiring part 21*a* and the birds-eye view data creating part 21*b*, creates the birds-eye view data by drawing as the birds-eye view the scenery to be acquired when viewing in the travel direction downward from the view position that is set at an upper point above the current position of the navigation terminal 10 as above. When the birds-eye view data is created, the controller 20, by the processing of the image display control part 21*d*, outputs the created birds-eye view data together with the information indicating the display position of the birds-eye view to the user I/F part 44 to display the birds-eye view on the display part.

In the image display control processing, the controller 20 initially, by the processing of the image display control part 21*d*, determines whether the birds-eye view is being displayed (Step S100). That is, the controller 20 determines whether the conditions for the display of the birds-eye view on the display part are met and the birds-eye view is drawn and displayed on the display part. When it is not determined at Step S100 that the birds-eye view is being displayed, the controller 20 skips Step S105 to Step S130. That is, when it is not determined that the birds-eye view is being displayed, the conditions for the display of the birds-eye view on the display part are not met. Therefore, the controller 20 terminates the processing without drawing the birds-eye view.

On the other hand, it is determined at Step S100 that the birds-eye view is being displayed, the controller 20, by the processing of the image display control part 21d, determines whether the panoramic view is being displayed (Step S105). That is, the controller 20, while the conditions for the display of the birds-eye view on the display part are met, determines whether the panoramic view is already drawn and displayed by the image display control processing.

When it is not determined at Step S105 that the panoramic view is being displayed, the controller 20 determines whether the user has performed an instruction for the display of the panoramic view on the display part of the user I/F part 44 (Step S110). When it is not determined at Step S110 that the user has performed an instruction for the display of the panoramic view, the controller 20 terminates the image display control processing. On the other hand, if it is determined that the user has performed an instruction for the display of the panoramic view, the controller 20 executes panoramic view data creating processing by the processing of the panoramic view data creating part 21c (Step S115).

Figure 3:
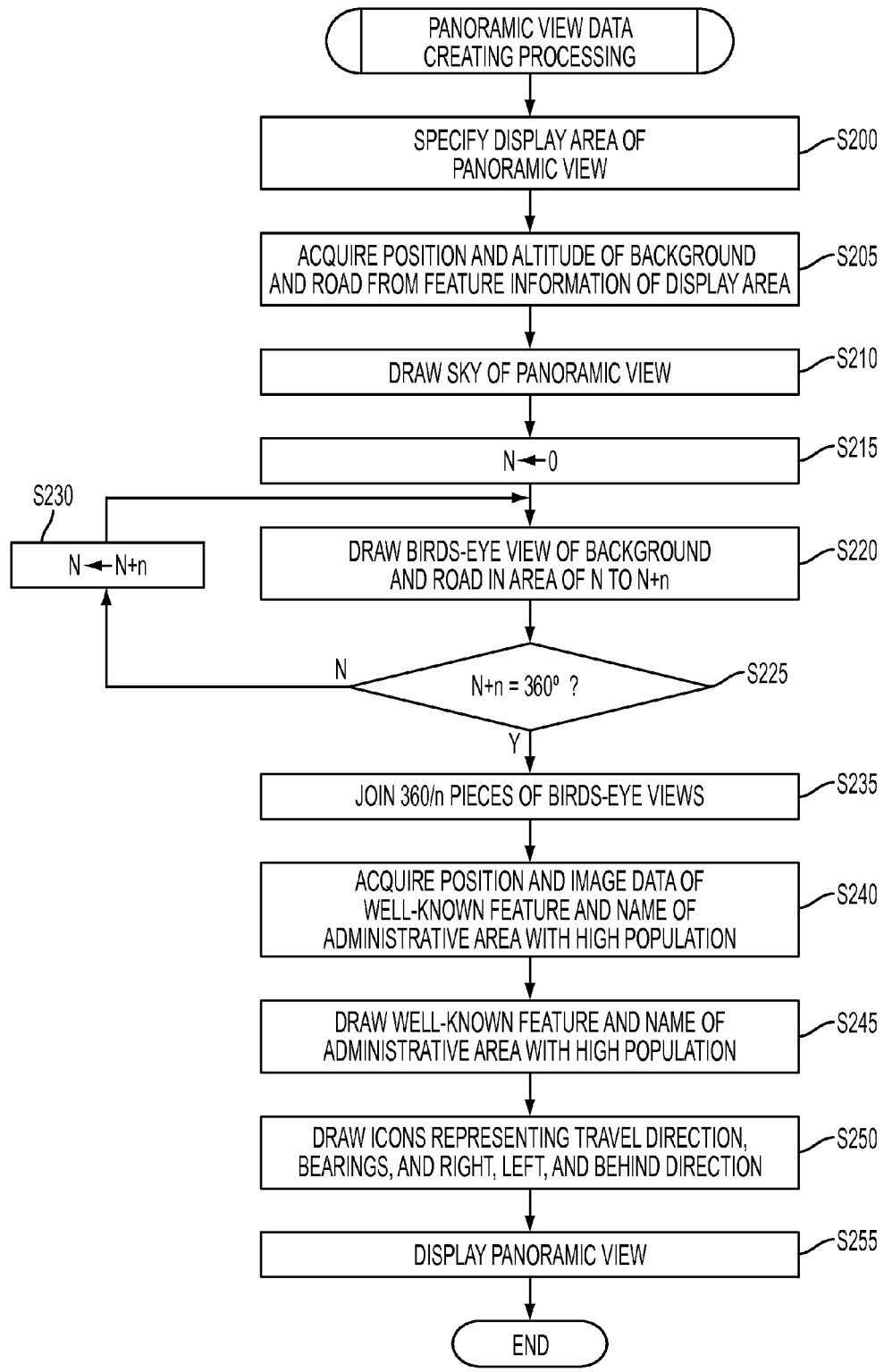
FIG. 3 is a flow chart showing panoramic view data creating processing.

(2-1) Panoramic View Data Creating Processing:

FIG. 3 is a flow chart showing the panoramic view data creating processing. In the panoramic view data creating processing, the controller 20 specifies a display area of the panoramic view (Step S200). That is, in the present embodiment, the panoramic view is drawn by assuming the view direction being capable of viewing further than the birds-eye view from the same view position as the birds-eye view. In this case, the distance (a distance to the position viewable as a horizon line (a sea horizon line if there is a sea ahead)) viewable by viewing in the view direction is previously determined. Here, the controller 20 sets an area within the distance from the current position of the navigation terminal 10 as the display area of the panoramic view and specifies all meshes including such area.

Next, the controller 20 acquires the positions and the altitudes of the background and roads from the feature information in the display area of the panoramic view (Step S205). That is, the controller 20 refers to the map information 30a of the meshes specified at Step S200, refers to the feature information 30b indicating the features included in the display area, and extracts the features whose attribute is background and the features whose attribute is road. Thereafter, the controller 20 acquires information indicating the positions and the altitudes of the respective features.

Next, the controller 20 draws the sky in the panoramic view (Step S210). That is, the controller 20 creates panoramic view data for drawing a previously-determined sky pattern in the part upper than the previously-determined horizon line (or the sea horizon line) in the panoramic view. Next, the controller 20 sets a variable N for computing a rotational angle of the view direction to 0 (Step S215).

Next, the controller 20 draws the birds-eye view of the background and the roads in an area of N deg. to N+n deg. (Step S220). That is, in the present embodiment, 360-degree panoramic view having as a rotational axis a line parallel to a line passing the current position of the navigation terminal 10 in the vertical direction is drawn. The panoramic view is created by repeating processing for drawing the birds-eye view for n deg. 360/n times and arranging and joining the created birds-eye views in the horizontal order.

To this end, at Step S220, the controller 20 extracts the information of the background and the roads of an area of N deg. to N+n deg. further than the information of the background and the roads acquired at Step S205. Thereafter, assuming the aforementioned view position and the aforementioned view direction for the panoramic view, the controller 20 sets a virtual projection plane in a direction perpendicular to the view direction at a position by a predetermined distance from the view position in the view direction. Further, the controller 20 refers to the information of the background and the roads of the area of N deg. to N+n deg. and structures the polygons of the background and the roads based on the positions and the altitudes of the background and the roads. Thereafter, the controller 20 specifies the coordinates of the intersection points between the lines connecting the vertexes of the polygons and the view position and the aforementioned projection plane and draws the circumferences of the background and the roads on the projection plane by connecting the coordinates by line. Thereafter, the controller 20 colors the parts corresponding to the pictures of the background and the roads with the designs of the background and the roads (for example, the mountain area in green, the ground in brown, and the roads in gray) to draw the birds-eye view for n deg. The data indicating the drawn birds-eye view for n° is stored in the RAM (not shown).

Next, the controller 20 determines whether N+n deg. is equal to 360 deg. (Step S225). When it is not determined that N+n deg. is equal to 360 deg., the controller 20 sets the value of the variable N to N+n (Step S230) and repeats the processing at Step S220 and subsequent steps. That is, every time the birds-eye view for n deg. has been drawn, the controller 20 adds n deg. to the variable N and draws the birds-eye view for n deg. till the birds-eye view for 360 deg. is created.

When it is determined at Step S225 that N+n deg. is equal to 360 deg., the controller 20 joins 360/n pieces of birds-eye views (Step S235). That is, the controller 20 allocates at the center the data of birds-eye view to be acquired when viewing in the travel direction of the navigation terminal 10 among the birds-eye views created for each n deg., sequentially joins to the right side of the allocated center birds-eye view the data of the birds-eye views to be acquired when rotating the view to the right side, and sequentially joins to the left side of the allocated center birds-eye view the data of the birds-eye views to be acquired when rotating the view to the left side. Thereafter, the controller 20 merges the created data with the panoramic view data already created at Step S210 to correct the panoramic view data. When the panoramic view data is corrected, the panoramic view data indicating the sky, the background, and the roads is completed. The panoramic view P shown in FIG. 4A is an example of the panoramic view drawn in the aforementioned manner. At Step S220 to S235, the background and the roads are drawn for each small area of n deg. Finally, the panoramic view P extending in the right and left direction as shown in FIG. 4A is drawn.

In the present embodiment, the scenery to be acquired when rotating the view direction by an angle greater than 180 deg. in the right and left direction from the travel direction of the navigation terminal 10 is drawn. That is, in order that a predetermined area right behind the travel direction of the navigation terminal 10 is included without being divided in the panoramic view, the controller 20 executes the aforementioned joining such that the scenery to be acquired when rotating the view direction by 180 deg.+α in the right and left direction from the travel direction of the navigation terminal 10 is displayed. The α is set to any value, provided that the features right behind are not divided. The α may be 10 deg., for example. According to such configuration, the predetermined area right behind the travel direction is displayed without being divided. Therefore, the user can easily recognize the features existing right behind, which is a direction the user can instinctively recognize, in the panoramic view.

In the panoramic view P shown in FIG. 4A, angles of view directions in the panoramic view P are indicated at the upper part of the rectangle T indicating a display screen of the display part. That is, the angles are assigned, defining the travel direction of the navigation terminal 10 as 0 deg., the angles when rotating the view to the right side as positive angles and the angles when rotating the view to the left side as negative angles. According to this definition, the angle right behind the travel direction is 180 deg. (or −180 deg.). In the example shown in FIG. 4A, the end of the right side of the panoramic view P reaches an angle greater than 180 deg. and the end of the left side of the panoramic view P reaches an angle smaller than −180 deg. As a result, the picture of the mountain existing right behind is not divided. Therefore, the user is able to easily compare the picture of the mountain with the mountain in the actual space.

Next, the controller 20 acquires the positions and the image data of well-known features and the names of administrative areas (for example, city, town, village, and the like) with high population (Step S240). That is, the controller 20 refers to the feature information 30b to search for well-known features existing in the aforementioned display area. When one or more well-known features exist in the display area, the controller 20 acquires the positions and the image data of the well-known features. In addition, the controller 20 refers to the feature information 30b to search for facilities where administrative works are conducted and which are located in the aforementioned display area. Further, when one or more facilities where administrative works are conducted exist in the display area, the controller 20 acquires information indicating the population of the administrative area corresponding to each facility. Thereafter, when the population is equal to or greater than a predetermined threshold value, the controller 20 acquires the information indicating the name of the administrative area corresponding to the facility where the administrative works are conducted as the name of the administrative area with high population.

Next, the controller 20 draws the well-known features and the names of the administrative areas with high population (Step S245). That is, the controller 20 specifies, based on the positions of the well known features and the facilities where administrative works are conducted, which are indicated by the feature information 30b, the positions of the well-known features and the facilities where the administrative works are conducted in the panoramic view. Thereafter, the controller 20 further corrects the panoramic view data corrected at Step S235 such that the image indicating the image data of the well-known features and the names of the administrative areas with high population are drawn at the specified positions. In the panoramic view P shown in FIG. 4A, the well-known features are illustrated by a rectangular or triangle shape and the names of the administrative areas with high population are illustrated by letters such as "A city" and the like.

As indicated above, the panoramic view can be easily drawn by displaying in the panoramic view the well-known features for which the image data is previously prepared. That is, there are a huge number of features existing in the display area of the panoramic view. Therefore, if the respective features are drawn based on the coordinates of the circumferences of the features, the processing load becomes excessively huge. In addition, if many small features are drawn in the panoramic view, the respective features become very difficult to be recognized. However, in the present embodiment, the well-known features are superimposed on the panoramic view. Therefore, the visibility of the features is not lowered. In addition, as the image data of the features target for display is previously prepared, it is not necessary to draw the polygons based on the coordinates or the like. Thereby, it is possible to draw the panoramic view with considerably-low processing load. In the same manner, as the names of the administrative areas are displayed only for the administrative areas with high population, the number of names target for display does not excessively increase. Therefore, the names of the administrative areas can be superimposed on the panoramic view without lowering the visibility.

Next, the controller 20 draws icons representing the travel direction, the bearings, right, left, and behind (Step S250). That is, the controller 20 determines the angles between the travel direction and the bearings (north, south, east and west) when the travel direction of the navigation terminal 10 is the center of the panoramic view in the right and left direction. In addition, the controller 20 determines the travel direction and the angles of right, left and behind. The controller 20 corrects the panoramic view data corrected at Step S245 such that the icons representing the bearings and the right, left and behind are drawn at the positions far by a distance corresponding to the respective angles from the center of the panoramic view and the icon representing the travel direction is drawn at the center of the panoramic view in the right and left direction.

Figure 4B:
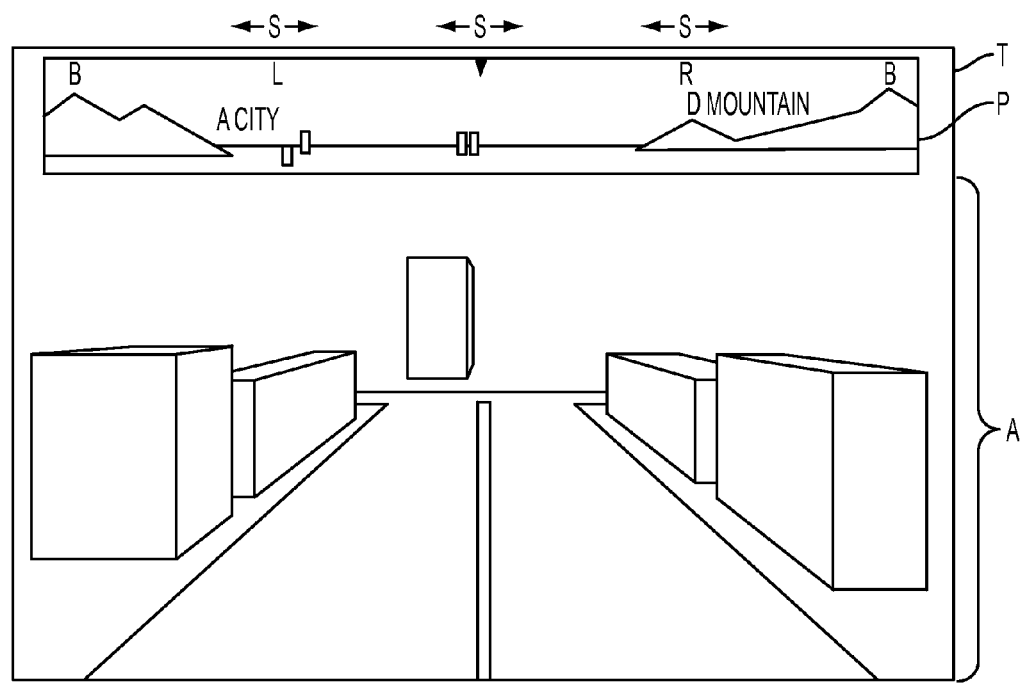

FIGS. 4A and 4B show an example that the icon representing the travel direction is a black triangle, the icons representing the bearing are N, S, E and W (representing north, south, east and west respectively), and the icons representing right, left, behind are R, L and B (representing right, left, and behind respectively). Because of these icons, the user can instinctively recognize the relation between the positions of the features in the panoramic view and the actual positions of the features. The bearings are only necessary to be specific directions in a fixed coordinate system relatively fixed to the ground surface, and may be information such as east, south, and the like. Besides the direction other than right, left, and behind, relative directions when the travel direction of the navigation terminal 10 is set as the front direction may be indicated. For example, the display indicating diagonally front right may be performed.

Next, the controller 20 displays the panoramic view (Step S255). That is, the controller 20 outputs the panoramic view data created by the aforementioned processing and the information indicating the display position of the panoramic view to the user I/F part 44 (Step S255). As a result, in the display part of the user I/F part 44, the panoramic view is displayed at the upper side of the position where the birds-eye view is drawn, as shown in FIG. 4A. After the panoramic view is displayed by the panoramic view data creating processing as mentioned above, the controller 20 goes back to the processing shown in FIG. 2 and terminates the current processing.

On the other hand, in the image display control processing shown in FIG. 2, when it is determined at Step S105 that the panoramic view is being displayed, the controller 20 determines whether the current position of the navigation terminal 10 has moved to a different mesh (Step S120). That is, the controller 20 determines whether the current position of the navigation terminal 10 has changed beyond a border of a mesh. When it is determined at Step S120 that the current position of the navigation terminal 10 has moved to a different mesh, the controller 20 executes the panoramic view data creating processing at Step S115. That is, in the present embodiment, when the current position of the navigation terminal 10 has moved beyond a border of a mesh, re-drawing of the panoramic view accompanied by the drawing of the birds-eye views is executed.

On the other hand, it is not determined at Step S120 that the current position of the navigation terminal 10 has moved to a different mesh, the controller 20 determines whether the travel direction of the navigation terminal 10 has moved (Step S125). That is, the controller 20 determines based on the output signals of the gyro sensor 43 whether the travel direction of the navigation terminal 10 (the travel direction of the vehicle) has changed.

When it is determined at Step S125 that the travel direction of the navigation terminal 10 has changed, the controller 20 slides the panoramic view (Step S130). That is, when the travel direction of the navigation terminal 10 has changed, the scenery to be acquired in the vicinity of the navigation terminal 10 is the same as the panoramic view shown in FIG. 4A. However, the position where the center of the panoramic view should be located has changed. Therefore, the controller 20 moves the panoramic view in the right or left direction by the angle corresponding to the angle by which the travel direction has rotated in the horizontal plane, and deletes the end part which exceeds the original angle area due to the movement and joins the deleted part to the end part of the opposite side. In addition, the controller 20 corrects the position of the icon representing the travel direction of the navigation terminal 10. For example, in the example shown in FIG. 4A, when the travel direction of the navigation terminal 10 has changed to the right direction, the controller 20 moves the panoramic view to the left, deletes the end part on the left side which has exceeded the original angle area, and joins the deleted part to the right side.

On the other hand, when it is not determined at Step S125 that the travel direction of the navigation terminal 10 has changed, the procedure skips Step S130. As mentioned above, in the present embodiment, once the panoramic view data is created, the re-drawing of the panoramic view data accompanied by the drawing of the birds-eye views is not executed till the current position of the navigation terminal 10 moves to a different mesh. The correction to slide the panoramic view according to the change of the travel direction of the navigation terminal 10 is only executed. Because of such configuration, it is possible to prevent the re-drawing of the panoramic view accompanied by the drawing of the birds-eye views from being frequently executed. Thereby, it becomes possible to continue displaying the panoramic view only with minor correction without giving the user uncomfortable feeling.

(3) Other Embodiments

The aforementioned embodiment is an example to realize the present invention. Therefore, other kinds of embodiments can be applied, provided that the birds-eye view and the panoramic view are displayed together and the travel direction of the navigation terminal 10 is superimposed on the panoramic view. For example, besides the embodiment in which the navigation terminal 10 is installed in the vehicle, the embodiment in which a pedestrian utilizes the navigation terminal 10 may be applied. Obviously, the navigation terminal 10 may be fixedly mounted in a vehicle. Or, the handheld navigation terminal 10 may be carried in the vehicle and utilized.

In addition, in displaying the well-known features in the panoramic view, when the pictures of the features are overlapped or the distance between the positions of the pictures is equal to or shorter than a predetermined distance, the more famous feature may be displayed and the less famous feature may not be displayed. In the same manner, in displaying the names of the administrative areas with high population in the panoramic view, when the names are overlapped or the distance between the display positions of the names is equal to or shorter than a predetermined distance, the name of the administrative area with more population may be displayed and the name of the administrative area with less population may not be displayed.

Further, in order to prevent the number of icons of the features to display in the panoramic view from being excessively increased, the icons may be selected based on various indexes. For example, the features existing in the direction within a previously-determined area from the respective icons representing the bearings or the respective icons representing relative directions when the travel direction of the navigation terminal 10 is set as the front direction, the icons being superimposed on the panoramic view, may be set as display target in the panoramic view and the features existing at other positions (outside the previously-determined area) in the panoramic view may not be set as display target in the panoramic view. According to such configuration, the panoramic view can be displayed without lowering the visibility of the features.

FIG. 4B shows an example that the pictures and names of the features existing within a previously-determined area S from the front direction, the right direction, the left direction, and the behind direction (represented by a triangle icon, letters of R, L, and B respectively) that are relative directions when the travel direction of the navigation terminal 10 is set as the front direction are displayed. According to such configuration, the features existing in the direction within the previously-determined area from the icon representing a relative direction when the travel direction of the navigation terminal 10 is set as the front direction are displayed. Therefore, it is possible to display the features existing in the bearings and the directions that the user can instinctively recognize and also possible to display the panoramic view easy to recognize for the user while limiting the number of features. The area S is determined such that the features within the area S could be identified in the panoramic view as the features existing in the directions (directions such as R, L, and the like) indicated by the icons. For example, the area S may be previously determined as the area of $\pm 10$ deg. In FIG. 4B, the bearings (N, E, W, S, and the like) are not displayed in the panoramic view. However, the bearings may be displayed and the features existing in the direction within the previously-determined area from each icon representing a bearing may be displayed.

In addition, other additional information may be superimposed on the panoramic view. For example, when route guidance for traveling from a departure point to a destination is being performed in the navigation terminal 10, the information indicating the destination and/or the route to the destination may be superimposed. According to such configuration, the destination and the route may be easily recognized in the panoramic view.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An image display control system containing a processor comprising:
    a feature information acquiring unit that acquires feature information indicating a three-dimensional shape and a position of a feature;

a travel direction determining unit that determines a travel direction of a navigation terminal;

a birds-eye view data creating unit that creates, based on the feature information, image data of a birds-eye view showing scenery to be acquired when viewing in the travel direction downward from a view position that is set at an upper point above a current position of the navigation terminal, the birds-eye view whose center is the travel direction;

a panoramic view data creating unit that creates, based on the feature information, image data of a panoramic view that is a 360-degree panoramic view having as a rotational axis a line parallel to a line passing the current position in the vertical direction at the current position, in a manner such that a center of the panoramic view is the travel direction and an icon representing the travel direction is superimposed at the center of the panoramic view; and an image display control unit that displays the birds-eye view and the panoramic view at a time on a display part installed in the navigation terminal, based on the image data of the birds-eye view and the image data of the panoramic view, wherein the image display control unit displays the birds-eye view and the panoramic view at a time in a manner such that a position of the icon superimposed at the center of the panoramic view matches a center position of the birds-eye view in the vertical direction.

2. The image display control system according to claim 1, wherein
the panoramic view data creating unit creates the image data of the panoramic view, on which at least one of an icon representing a bearing and an icon representing a relative direction when the travel direction is set as a front direction is superimposed.

3. The image display control system according to claim 2, wherein
the panoramic view data creating unit creates the image data of the panoramic view showing the scenery to be acquired such that a predetermined area right behind the travel direction is included without being divided in the panoramic view.

4. The image display control system according to claim 2, wherein
the panoramic view data creating unit creates the image data of the panoramic view, on which at least one of an icon and a letter representing a feature existing in a direction within a previously-determined area from the at least one of the icon representing a bearing and the icon representing a relative direction when the travel direction is set as the front direction is superimposed.

5. The image display control system according to claim 1, wherein the panoramic view data creating unit, in a case in which the travel direction changes, moves the panoramic view by an angle corresponding to the change of the travel direction.

6. An image display control method performed by a computer system comprising the steps of:

determining a travel direction of a navigation terminal;
acquiring feature information indicating a three-dimensional shape and a position of a feature;
creating, based on the feature information, image data of a birds-eye view showing scenery to be acquired when viewing in the travel direction downward from a view position that is set at an upper point above a current position of the navigation terminal, the birds-eye view whose center is the travel direction;
creating, based on the feature information, image data of a panoramic view that is a 360-degree panoramic view having as a rotational axis a line parallel to a line passing the current position in the vertical direction at the current position, in a manner such that a center of the panoramic view is the travel direction and an icon representing the travel direction is superimposed at the center of the panoramic view; and
displaying the birds-eye view and the panoramic view at a time on a display part installed in the navigation terminal, based on the image data of the birds-eye view and the image data of the panoramic view,
wherein the birds-eye view and the panoramic view are displayed at a time in a manner such that a position of the icon superimposed at the center of the panoramic view matches a center position of the birds-eye view in the vertical direction.

7. An image display control program stored on a non-transitory computer readable medium causing a computer to execute the functions of:
determining a travel direction of a navigation terminal;
acquiring feature information indicating a three-dimensional shape and a position of a feature;
creating, based on the feature information, image data of a birds-eye view showing scenery to be acquired when viewing in the travel direction downward from a view position that is set at an upper point above a current position of the navigation terminal, the birds-eye view whose center is the travel direction;
creating, based on the feature information, image data of a panoramic view that is a 360-degree panoramic view having as a rotational axis a line parallel to a line passing the current position in the vertical direction at the current position, in a manner such that a center of the panoramic view is the travel direction and an icon representing the travel direction is superimposed at the center of the panoramic view; and
displaying the birds-eye view and the panoramic view at a time on a display part installed in the navigation terminal, based on the image data of the birds-eye view and the image data of the panoramic view,
wherein the birds-eye view and the panoramic view are displayed at a time in a manner such that a position of the icon superimposed at the center of the panoramic view matches a center position of the birds-eye view in the vertical direction.

\* \* \* \* \*